(No Model.)
J. M. DODGE.
CHAIN WHEEL.
No. 358,771. Patented Mar. 1, 1887.
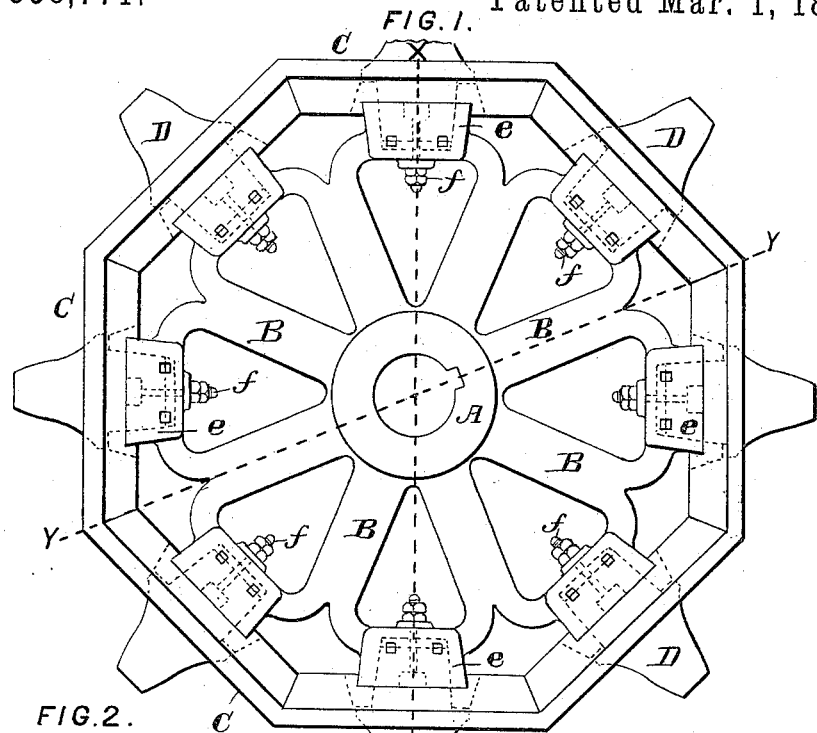
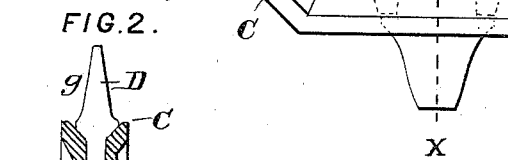
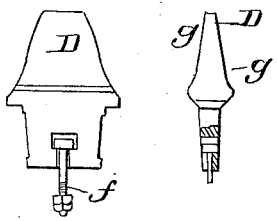
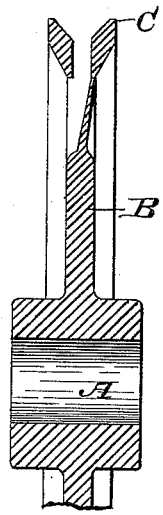
WITNESSES:
J. Henry Kaiser
Harry L. Amer
INVENTOR
James M. Dodge
By J. N. McIntire
ATTORNEY

UNITED STATES PATENT OFFICE.

JAMES M. DODGE, OF PHILADELPHIA, PENNSYLVANIA, ASSIGNOR TO THE EWART MANUFACTURING COMPANY, OF CHICAGO, ILLINOIS.

CHAIN-WHEEL.

SPECIFICATION forming part of Letters Patent No. 358,771, dated March 1, 1887.

Application filed October 4, 1886. Serial No. 215,295. (No model.)

*To all whom it may concern:*

Be it known that I, JAMES M. DODGE, of Philadelphia, in the county of Philadelphia and State of Pennsylvania, have invented a new and useful Improvement in Chain-Wheels; and I do hereby declare that the following is a full, clear, and exact description thereof, reference being had to the accompanying drawings, making part of this application.

My invention relates to chain or sprocket wheels used in connection with drive-chains, and has for its main objects to provide for use a wheel which shall be more efficient and desirable in practice than any heretofore made, by reason of certain novel features of structure which I will presently explain.

As is well understood by those familiar with the practical working of drive-chains (or chain belts) and the sprocket-wheels used in connection therewith, it is essentially necessary that the pitch-circle of the wheel remain unchanged, for as soon as any material change in this circle shall have occurred the toothed wheel will not correspond in pitch to the pitch of the chain, and the result will be that the chain will not work properly over the said wheel. It has therefore been heretofore deemed necessary to make such chain-wheels of very hard material to withstand the wear to which the rims or peripheries are subjected by the frictional contact therewith of the chains run on such wheels; and to render the working portions of such wheels capable of running in connection with ordinary chain belts for a reasonably long time without such wear as might materially change their pitch-circles, and thus render them incapable of successful operation in conjunction with chain of a pitch corresponding to that of the wheel as manufactured, it has been customary to make these wheels of chilled iron. Wheels thus made are, however, comparatively expensive, as only charcoal-iron or metal of a costly quality can be used for chilled castings; and, furthermore, just in proportion to the degree of hardness (and hence the degree of durability and perfection) of the wheel is the latter rendered destructive of the chain which has to run in engagement with the teeth or sprockets of said wheel, all marketable drive-chain or chain belting being made of malleable cast-iron, which, being soft, compared with the chilled cast-iron sprockets of the wheels, is soon destroyed by frictional contact with said sprockets.

I propose to provide for use cast-iron sprocket-wheels which shall be capable of as great endurance, with reference to the rims or peripheries, as the chilled-iron wheels heretofore and now in use, to avoid any change by wear in their pitch-circles, but which, unlike the chilled cast-iron wheels now in use, shall at the same time be incapable of rapidly wearing away the working faces or parts of the malleable-iron chains used on such wheels. This great desideratum I accomplish by the use of a compound chain-wheel—that is, one having its body or the hub, arms, and rim composed of chilled cast-iron, and having separately-cast teeth of softer iron or other metal or material securely but removably attached to the rim.

To enable those skilled in the art to which my invention relates to fully understand and practice it, I will now proceed to more fully explain my improved construction or manufacture of chain-wheel, referring by letters to the accompanying drawings, which form a part of this specification, and in which I have illustrated my invention carried out in that form which is the best now known to me, and in which I have so far successfully practiced it.

In the drawings, Figure 1 is a side view of a chain-wheel made according to my invention. Fig. 2 is a partial cross or diametric section of the same at the line *x x* of Fig. 1. Fig. 3 is a similar sectional view, but taken at the line *y y* of Fig. 1; and Fig. 4 is a view showing in detail and detached from the wheel's rim one of the separately-cast teeth.

In the several figures the same part will be found designated by the same letter of reference.

A is the hub, B the arms, and C the rim, of a wheel having these parts preferably cast integrally and having its rim C or the working-surfaces thereof chilled in the usual manner, in order to render it very hard and enduring that the pitch-circle of the wheel may not be easily changed by such wear as might otherwise be inflicted upon the working-surfaces of the rim by the frictional action thereon of the metallic belting or drive-chain run on the wheel.

D are the sprockets or teeth of the wheel, which I make of common soft cast-iron, or of any other metal or material sufficiently strong and durable, but not hard enough to injuriously affect by wear the working parts of malleable-iron drive-chains such as most commonly used as link-belting.

The chilled rim C is made in the case shown with a V-shaped depression or groove in its face; but this form is of course not essential to my invention, and just within the contour of said rim are formed a series of seats, e, within which are seated and secured the roots of the detachable or removable teeth D. Each of said teeth D is firmly secured in place by means, preferably, of a bolt, f, (which enters the bottom of each of the seats e in a direction radially of the wheel,) and a mortise-nut let into the root of the tooth through a mortise in one side of the seat e, all as clearly shown.

Each tooth D, it will be seen, is shaped so that its tapering lateral projections g (see Figs. 2 and 4) come to a bearing against or are seated on the tapering sides of the depression in the periphery of the rim, and thus when drawn home in their places by the securing-bolts f the teeth are very securely held in place, while at the same time, by the means of securement shown, a perfect adjustment of the teeth (relatively to each other and to the facets of the rim) is easily made before they are finally fastened. It will be understood, however, that other means than those I have shown may be employed for securing the teeth to the rim.

It will be understood that in a wheel made according to my invention the main or greater portion of the article (which is made of the more costly metal) is very lasting, so that the pitch-circle of the wheel will never materially change by wear, while at the same time the teeth, which are made soft enough not to injuriously wear the malleable-iron chain or link-belting, may be frequently renewed at comparatively little expense, they being made of cheap castings, and the drive-chain will not be injuriously worn by the action of the sprockets.

What I claim, broadly, as new, and desire to secure by Letters Patent, is—

A chain-wheel or sprocket-wheel having a chilled or otherwise hardened metallic rim and provided with removable sprockets made of softer cast metal or other material, whereby the wheel is rendered capable of retaining its pitch-circle, and at the same time incapable of rapidly wearing out chain such as usually run on such wheels, all substantially as hereinbefore set forth.

In witness whereof I have hereunto set my hand.

JAMES M. DODGE.

In presence of—
D. S. GARWOOD,
C. A. FRY.